United States Patent [19]

Dietrich et al.

[11] Patent Number: 4,483,209
[45] Date of Patent: Nov. 20, 1984

[54] SPINDLE DRIVE FOR MEASURING DEVICES AND COORDINATE MEASURING CENTERS

[75] Inventors: Hermann Dietrich, Ludwigshafen; Hans J. Nösges, Rottweil; Gerhard Band, Oberndorf, all of Fed. Rep. of Germany

[73] Assignee: Mauser-Werke Oberndorf GmbH, Fed. Rep. of Germany

[21] Appl. No.: 438,801

[22] Filed: Nov. 3, 1982

[30] Foreign Application Priority Data

Nov. 5, 1981 [DE] Fed. Rep. of Germany ... 8132380[U]

[51] Int. Cl.³ .............................................. F16H 27/02
[52] U.S. Cl. .............................. 74/89.15; 74/424.8 R
[58] Field of Search .................... 74/89.15; 74/424.8 R

[56] References Cited

U.S. PATENT DOCUMENTS

| | | | |
|---|---|---|---|
| 3,425,304 | 2/1969 | Beisswenger | 74/424.8 R X |
| 3,745,840 | 7/1973 | Guralnick | 74/89.15 |
| 3,913,412 | 10/1975 | Hart et al. | 74/424.8 R |
| 4,075,898 | 2/1978 | Carlson, Jr. | 74/89.15 |
| 4,148,235 | 4/1979 | Gerth | 74/424.8 R X |
| 4,179,944 | 12/1979 | Conner | 74/89.15 |
| 4,372,223 | 2/1983 | Iwatani | 74/89.15 X |

FOREIGN PATENT DOCUMENTS 2060445  5/1981  United Kingdom ............... 74/89.15

*Primary Examiner*—Leslie A. Braun
*Assistant Examiner*—Dwight G. Diehl
*Attorney, Agent, or Firm*—McGlew and Tuttle

[57] ABSTRACT

A spindle drive for measuring devices comprises a threaded spindle with a nut threadably engaged on the spindle and with one of them being rotatable to cause displacement relative to the other along a longitudinal direction in relation to the spindle. A nut carries a slide portion with vertically extending posed blind bores carrying bushings with ball races therein. A measuring carriage is affixed and forms part of a support portion which extends over the slide and the measuring carriage portion extend below the slide. A drive pin is carried by the support portion and the measuring portion and it is confined for movement within the respective bushings. A screw bolt is connected between the support portion and the slide and it may be threadably adjusted to permit vertical adjustable positioning of the slide relative to the measuring carriage and the support portion.

6 Claims, 2 Drawing Figures

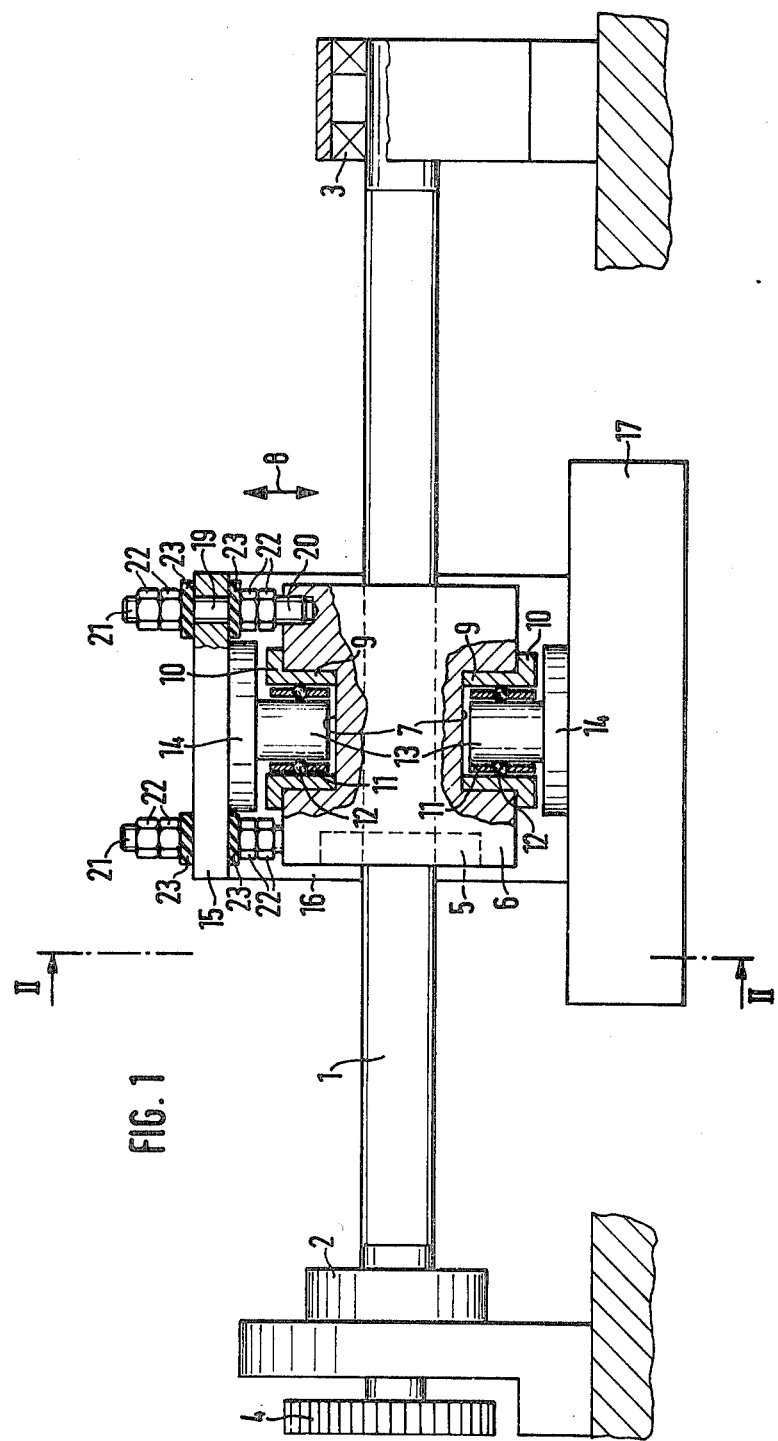

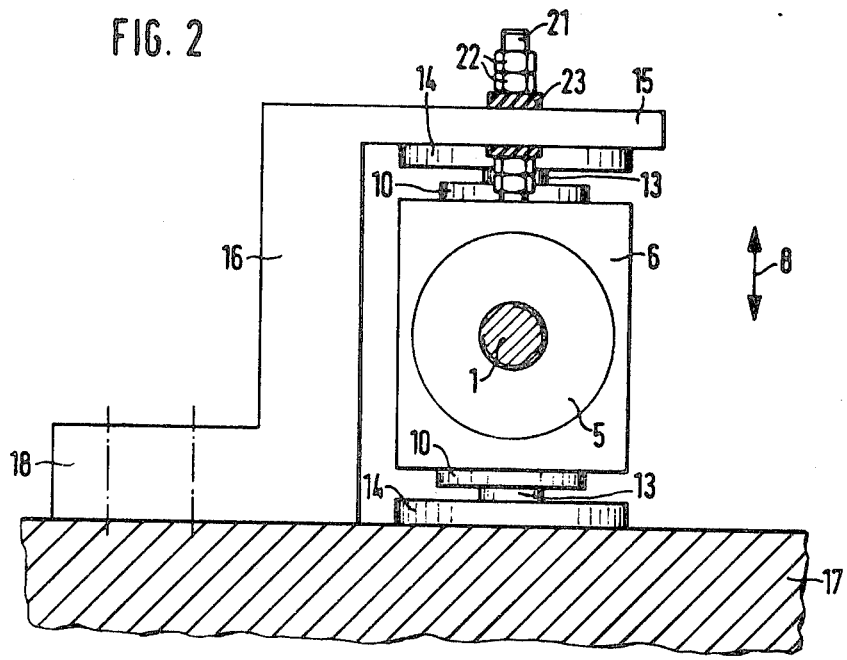

SPINDLE DRIVE FOR MEASURING DEVICES AND COORDINATE MEASURING CENTERS

FIELD AND BACKGROUND OF THE INVENTION

The invention relates to a spindle drive for measuring devices and coordinate measuring centers, comprising a horizontally mounted drive spindle which is engaged without play with a nut while the nut is connected to a slide which is displaceable in the lengthwise direction by the spindle drive, with either a driven spindle engaging a fixed nut or, in kinematic reversal, a driven nut engaging a fixed spindle, and with the slide being firmly connected to a measuring carriage or the like movable below the drive spindle, through a screw connection and a bracket arm of a supporting structure, which arm roofs both the drive spindle and the slide.

With prior art spindle drives, a lengthwise displacement of a measuring carriage is obtained while turning the drive spindle in the fixed nut. This transformation of a rotary motion into a lengthwise or advance motion usually fails to be effected without a deformation and displacement of the measuring carriage from the ideal position of the parts to be driven. Already slight deformations result in a change in the position of the already aligned measuring carriage.

Non-circularity of the drive spindle or the small-size nut or even slight imperfections of the thread of the spindle or nut cause misalignments in the position of the measuring carriage and lead to measuring errors.

Upon a slight angular correction of the measuring carriage, which is unavoidable in the final adjustment, a subsequent alignment of the drive spindle center is always necessary.

SUMMARY OF THE INVENTION

The invention is directed to a spindle drive of the above-mentioned kind, comprising neutral means for taking along the measuring carriage and thus preventing the carriage from changing its position after the advance motion was accomplished.

In accordance with the invention, a spindle drive for measuring devices comprises a threaded spindle with a nut threadably engaged on the spindle and one of the nut and the spindle being rotatable to cause displacement relative to the other along a longitudinal direction in relation to the spindle. The nut carries a slide portion with vertically extending opposed blind bores directed toward an overhead support portion and an underlying measuring carriage portion which extends below the slide. A drive pin carried by the respective overhead portion and the measuring carriage portion is confined for vertical movement in a ball race in a bushing carried in the bores. A screw bolt connection is established between the support and the slide so as to permit vertical adjustable positioning of the slide relative to the measuring carriage and the support. The driver pins of the support and the carriage which are confined for movement in the ball race of the bushing permits position variations of the measuring carriage relative to the slide and the adjustable screw bolt connection between the slide and the support and measuring carriage permits adjustment in a selected axis.

The arrangement of the invention is improved by providing not only a single drive pin between the measuring carriage and the slide but also a second drive pin is carried by the overlying support portion. This in addition to the circularly distributed balls of the ball race of the bushing which ensures a smooth even adjustment between the carriage and the slide. In order to prevent the spindle system from resonant vibration or excessive yielding, the support structure includes an overlying portion or roofing part with at least one screw nut connection which is adjustable between it and the slide. The adjustment may be effected by the threadable engagement of the screw bolts into the slide and further by adjustment nuts which are tensioned against the overhead portion.

An object of the invention is to provide an improved spindle drive for measuring devices in which a measuring carriage is moved backwardly and forwardly through the rotation of a spindle or a nut thereon and in which the carriage is supported on a slide portion of a movable nut so as to permit its adjustable movement in one coordinate direction.

A further object of the invention is to provide a spindle drive which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a side elevational view partly in section of spindle drive for a measuring carriage constructed in accordance with the invention; and FIG. 2 is a section taken along the line II—II of FIG. 1.

DESCRIPTION OF THE PREFERRED EMBODIMENTS

Referring to the drawings in particular the invention embodied therein, comprises a threaded drive spindle 1 which is supported in rotatable bearings 2 and a nut 5 which is threadably engaged on the spindle. One of either the nut 5 or the spindle 1 is rotatable to cause one of these parts to be displaceable relative to the other in respect to the longitudinal direction of the spindle 1. In accordance with the invention the nut 5 carries a slide portion 6 which has vertically extending opposed blind bores 7, 7 which open outwardly in respective opposite directions. Each bore carries a bushing 9 having a ball race 11 therein.

A measuring carriage 17 is carried by or includes a support portion structure 16 having an overhead part 15 which overlies the slide 6. The measuring carriage portion 17 extends below the slide 6 and it carries a drive pin 13 as does the overhead portion 15. The drive pins 13,13 engage into respective races 11 of the bushings 9 and they may be moved upwardly and downwardly therein. In order to control the amount of movement of the measuring carriage 17 relative to the slide the overhead portion or bracket arm 15 is provided with one or more screw bolts 19 which are threaded into receiving bores of the slide 6. Screw bolts 19 may be threadably adjusted and held fast in an adjusted position by securing nuts 22.

The spindle drive comprises a horizontally extending drive spindle 1 which is mounted for rotation in bearings 2 and 3 and is driven in rotary motion by a motor (not shown) through a gear 4. Drive spindle 1 is engaged with a nut 5 in a manner free from play. Nut 5 itself is fixedly connected to a slide 6. This makes it possible to transform a rotary motion into a translational or lengthwise motion.

Slide 6 is provided with two blind bores 7,7 which oppose each other symmetrically and extend both at right angles to drive spindle 1, in the z-coordinate direction 8. Inserted in each blind bore 7 is a bushing 9 having a flange 10 applied against the slide 6. Bushing 9 includes a ball race 11 with balls 12, and a driver pin 13 is inserted into the blind bore 7 aligned with bushing 9. Balls 12 are positioned about intermediate the length of bushing 9, along a circumferential circle, and their number is adjusted to the diameter of driver pin 13. Driver pin 13 is always provided with a collar 14 which extends outside the respective blind bore and is connected, on one side, to bracket arm 15 of supporting structure 16 extending over or roofing drive spindle 1, and slide 6, and on the other side, directly to measuring carriage 17 which is movable below drive spindle 1. The base 18 of supporting structure 16 is also connected to measuring carriage 17.

In bracket arm 15, two bores are provided which are aligned in the vertical plane of the drive spindle axis and through which screw bolts 19 are passed which are screwed by their lower ends 20 in tapholes which are provided in slide 6. The other ends 21 of screw bolts 19 project above bracket arm 15 to the outside. At both the underside and the top of bracket arm 15, nuts 22 are screwed on bolts 19, which are firmly tightened against bracket arm 15 through adjustable damping elements 23, so that upon an advance movement, an overall adjustment in the z-coordinate is made possible.

In kinematic reversal of the disclosed spindle drive, a non-rotatably mounted drive spindle 1 may be provided instead of the rotary one; in such a design, the nut is mounted for rotation, and again takes the slide along in a straight lengthwise motion.

While a specific emboidment of the invention has been shown and described in detail to illustrate the application of the principles of the invention, it will be understood that the invention may be embodied otherwise without departing from such principles.

What is claimed is:

1. A spindle drive for measuring devices, comprising a threaded spindle, a nut threadably engaged on said spindle, one of said nut and said spindle being rotatable to cause one of these parts to be displaceable relative to the other of these parts along a longitudinal direction in relation to said spindle, said nut having a slide portion with at least one vertically extending blind bore, a bushing having a ball race in said blind bore, a measuring carriage having a support portion extending over said slide portion and a measuring carriage portion extending below said slide portion, at least one drive pin carried by said measuring carriage and guided in the ball race of said bushing, and a screw bolt connected between said support portion and said slide permitting vertical adjustable positioning of said slide relative to said measuring carriage.

2. A spindle drive according to claim 1, wherein there are at least two oppositely extending blind bores in said slide and including a drive pin carried by said measuring carriage portion and said support portion extending into respective ones of said bushings.

3. A spindle drive according to claim 1, wherein said drive pin includes a collar portion at its connection to said measuring carriage which is connected directly to said measuring carriage.

4. A spindle drive according to claim 1, wherein said bushing includes a flange at its exterior ends surrounding associated blind bore.

5. A spindle drive according to claim 1, wherein said ball race in said bushing extends along a circle extending intermediate the length of said bushing.

6. A spindle drive according to claim 1, wherein said screw bolt connection between said support portion of said measuring carriage and said slide comprises at least one screw and nut connection between said support portion and said slide and damping means disposed between said nut connections and said support portion on both sides thereof extending around said screw bolts.

* * * * *